United States Patent
Albahari et al.

(10) Patent No.: US 7,962,497 B2
(45) Date of Patent: Jun. 14, 2011

(54) RELATIONSHIP MODELING

(75) Inventors: Benjamin Albahari, Seattle, WA (US);
Michael E. Deem, Redmond, WA (US);
Henricus Johannes Maria Meijer,
Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 597 days.

(21) Appl. No.: 11/230,983

(22) Filed: Sep. 20, 2005

(65) Prior Publication Data

US 2006/0190927 A1 Aug. 24, 2006

Related U.S. Application Data

(60) Provisional application No. 60/654,237, filed on Feb. 18, 2005.

(51) Int. Cl.
*G06F 17/30* (2006.01)
*G06F 15/16* (2006.01)

(52) U.S. Cl. ........ 707/756; 707/602; 707/762; 707/809; 707/975

(58) Field of Classification Search ...... 718/1; 715/513; 707/103 R, 102, 602, 756, 762, 809, 975, 707/999.01–999.206
See application file for complete search history.

(56) References Cited

U.S. PATENT DOCUMENTS

| | | | |
|---|---|---|---|
| 5,295,256 A | | 3/1994 | Bapat |
| 5,659,723 A | * | 8/1997 | Dimitrios et al. ......... 707/103 R |
| 5,806,069 A | * | 9/1998 | Wakiyama et al. ........... 707/102 |
| 6,078,926 A | * | 6/2000 | Jensen et al. ......................... 1/1 |
| 6,366,934 B1 | * | 4/2002 | Cheng et al. .................. 715/513 |
| 6,374,252 B1 | * | 4/2002 | Althoff et al. ................. 707/102 |
| 6,434,568 B1 | * | 8/2002 | Bowman-Amuah ...... 707/103 R |
| 6,854,113 B1 | * | 2/2005 | Sankar et al. ....................... 718/1 |
| 2001/0051949 A1 | * | 12/2001 | Carey et al. ............... 707/103 R |
| 2005/0021523 A1 | * | 1/2005 | Farag ............................ 707/100 |
| 2005/0125401 A1 | * | 6/2005 | Carr et al. ......................... 707/5 |

FOREIGN PATENT DOCUMENTS

WO WO95/03586 A1 2/1995

* cited by examiner

*Primary Examiner* — Greta L Robinson
*Assistant Examiner* — Dennis Truong
(74) *Attorney, Agent, or Firm* — Workman Nydegger

(57) ABSTRACT

The subject disclosure pertains to relationships between items. Relationships between items can be defined external to the items themselves thereby providing a modular, flexible and extensible system. For instance, relationships between items can be defined in a class that includes methods for returning particular elements or values in accordance with a specified relationship. Moreover, a compiler or like system can be extended to accept relationship expressions in a simple property format and direct such calls to specific methods.

18 Claims, 13 Drawing Sheets

RELATIONSHIP MODELING

CROSS-REFERENCE TO RELATED APPLICATIONS

This application claims the benefit of U.S. Provisional Application Ser. No. 60/654,237, filed Feb. 18, 2005 and entitled "OBJECT ORIENTED RELATIONSHIP MODELING." The entirety of this provisional application is incorporated herein by reference.

BACKGROUND

Programming languages are formal languages employed specifically to communicate instructions to computers or microprocessors for task execution. Through the years, object oriented programming has become one of many familiar and popular models designers and programmers utilize to implement functionality within computer systems. Object oriented programming is unique at least because it is premised on viewing programming in terms of objects or things rather than actions like other models.

The benefit of object technology arises out of three basic principles: encapsulation, polymorphism and inheritance. Objects hide or encapsulate the internal structure of their data and associated methods. Instead of exposing implementation details, objects present interfaces that represent their abstractions cleanly without extraneous information. Polymorphism takes encapsulation one-step further. Polymorphism allows the use of the same code for different data types—the idea being many shapes, one interface. Hence, a software component can make a request of another component without knowing exactly what that component is. The component that receives the request interprets it and figures out according to its variables and data how to execute the request. The third principle is inheritance, which enables developers to reuse pre-existing design and code. This capability allows developers to avoid creating all software from scratch. Rather, through inheritance, developers can derive subclasses that inherit and modify both state and behaviors of other classes.

The object oriented programming model is often defined via a class-based approach. In this system, objects are entities including both state and behavior. Both the state and behavior of an object are defined by a class, which identifies objects of a particular type. An object created based on a class definition is considered an instance of that class reflected in a dynamic type. Thus, a class specifies the data (i.e., state) that the object can contain as well as methods, functions, or behaviors that the object can perform. Methods operate to modify the internal state of the associated objects by altering the data contained therein. The combination of such data and methods in objects is often referred to as encapsulation in object-oriented programming. Encapsulation provides for the state of an object to be changed only by well-defined methods associated with the object. When the behavior of an object is confined to such well-defined locations and interfaces, changes (e.g., code modifications) in the object will have minimal impact on the other objects and elements in the system.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described the subject disclosure concerns expression of relationships between items and/or elements thereof. More specifically, relationships are treated as first class concepts. According to an aspect of the subject disclosure, relationships can be represented by a construct external to the items, such as a class, that provides mechanisms or methods that compute and/or navigate relationships. In accordance with another aspect of the subject innovation, relationship methods can be invoked utilizing a data type property notation.

Aspects of the subject innovation are beneficial at least in that they provide an extensible and easy to use system and method for interacting with relationships amongst items. By making relationships a first class programming object, new relationships can be created between existing items without modifying the items. This is valuable at least because it allows definition of relationships between some or all items or elements that may not be under a programmer's control or where it would be impractical to modify such elements to reflect a new relationship. Still further yet, invocation of class methods can be easily accomplished via a property representation and mapped to the actual method notation.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
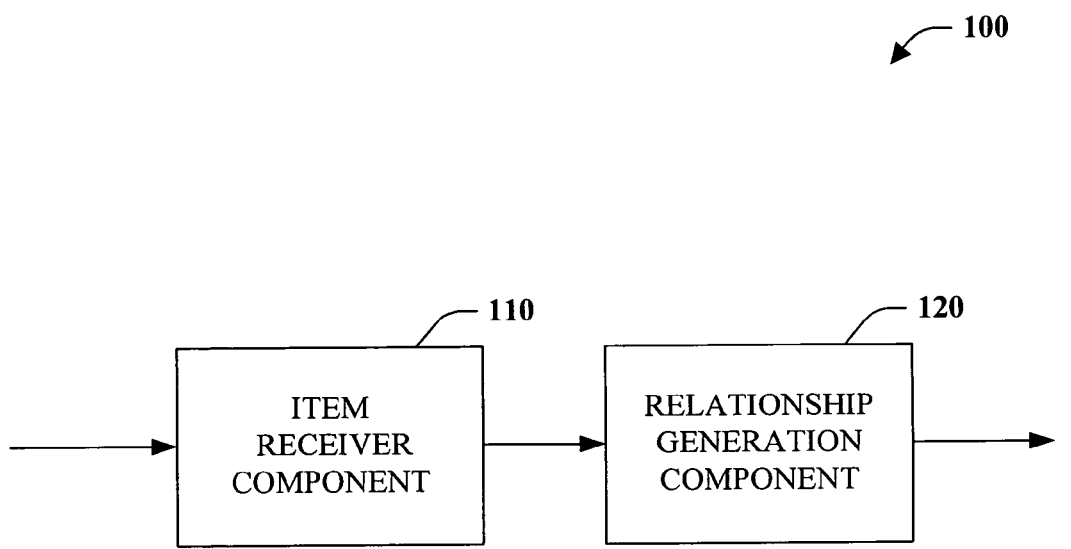
FIG. 1 is a block diagram of a relationship system.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Furthermore, various exemplary code snippets are provided herein. It should be appreciated that these examples are provided for purposes of clarity and understanding and are not meant to limit the scope of the disclosed subject matter to the languages, architectures, and/or features thereof employed in the description of various aspects of the claimed subject matter.

Artificial intelligence based systems (e.g., explicitly and/or implicitly trained classifiers, knowledge based systems . . . ) can be employed in connection with performing inference and/or probabilistic determinations and/or statistical-based determinations in accordance with one or more aspects of the subject innovation as described infra. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Additionally, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, jump drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Turning initially to FIG. 1, a relationship system 100 is depicted in accordance with an aspect of the disclosure. The relationship system 100 can include an item receiver component 110 and a relationship generation system 120. The item receiver component 110 receives, retrieves, or otherwise obtains items and/or elements thereof. These items can include but are not limited to data types, objects, web pages, and XML documents. Relationship generation component 120 receives, retrieves, or otherwise acquires a plurality of items from the item receiver component 110. The relationship generation component 120 analyzes the items and specifies and/or defines relationships amongst the items. For instance, the relationships can be defined in a programmatic construct such as a class or more specifically a static class. The class can include methods or references to methods outside the class that encapsulate functionality for retrieving various sets of items or elements thereof in accordance with a particular relationship.

It should be noted that relationship generation system 100 is beneficial in more than one way. For example, system 100 supports separation of concepts such items and relationships or links amongst them as well as modularity in development. Still further yet, separation of items and relationships provide flexibility and extensibility as the items may not always be available for alteration or it may not be practical to modify them. For instance, consider a situation where there is collection of people and data or properties about each person defined in some legacy format decades ago. Subsequently, it may not be possible or feasible to modify that collection to add mobile phone numbers for each person. Now a separate relationship construct can be generated to associate the people collection and a separate cell phone collection.

Figure 2:
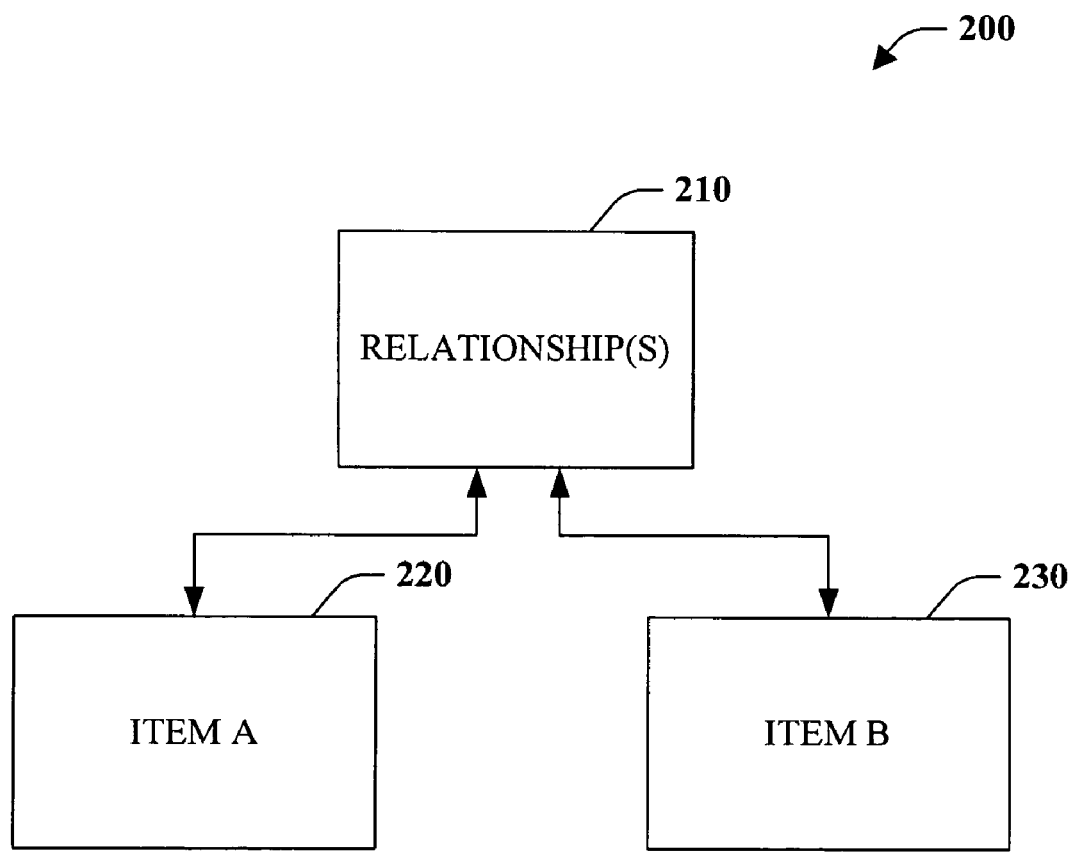
FIG. 2 is a block diagram of an exemplary relationship system.

FIG. 2 illustrates an exemplary relationship interaction system 200. System 200 is provided to facilitate description and discussion of aspects of the subject innovation. System 200 includes one or more relationship methods 210 and two items A 220 and B 230. As is graphically depicted, relationships between item A 220 and item B 230 are not defined within or as properties of the items. Rather, the relationship is defined external to the items as a first class concept. Relationship methods 210 encapsulate the computation to interact with items and item elements.

By way of example and not limitation, consider an object to relational mapping scenario. In particular, the situation is one in which it is desirous to program against database relations with objects. A database table conceptually containing objects of type T can be represented in a programming language with a collection type such as IEnumerable<T> in C# where T is a class with properties that map to the table's fields. A database relationship can then be represented in the programming language with a static class. That class provides static methods that navigate these relationships, by encapsulating join conditions. For instance, item A 220 can be an object, type or class that corresponds to a customer table, and item B 230 can be an object, type or class that corresponds to an order table. For example:
public class Customer { . . . }
public class Order { . . . }

Relationships 210 can be defined separate from the items A 210 and B 220 in a programmatic constructs such as a static class as follows:

```
public static class OrderRelationship {
    public static Customer GetCustomerGivenOrder(Order order);
    public static IEnumerable<Order> GetOrdersGivenCustomer
(Customer, customer);
    public static IEnumerable<Customer> GetCustomersGivenOrders
(IEnumerable<Order> orders);
    public static IEnumerable<Order> GetOrdersGivenCustomers
(IEnumerable<Customer> customers);
}
```

Here the class methods provide a mechanism to navigate a data store in accordance with a plurality of relationships that can exist between customers and orders. Here, binary relationships are encapsulated by the class and class methods. Binary relationships can include one-to-one, one-to-many, many-to-one, and many-to-many relations. The first method "GetCustomerGivenOrder" captures a one-to-one relationship in which a customer is retrieved given a particular order. The second method, "GetOrdersGivenCustomer" is a many-to-one relationship. Here, a plurality of orders associated with a particular customer are retrieved. The third method and forth methods "GetCustomersGivenOrders" and "GetOrdersGivenCustomers" are many-to-many. In particular, the first method retrieves collection of customers associated with specified orders. Given a set of orders, the fourth method can retrieve the related customers.

The aforementioned and subsequent examples are not meant to limit the scope of the appended claims. Aspects of this disclosure are applicable to any situation where there is a relationship or navigation between items. For instance, consider a linked documents scenario. Item A 220 and item B 230 can be electronic documents in anyone of a variety of formats including but not limited to hypertext and XML. Rather than including a link such as a hyperlink from item A 220 to item B 230. The relationship 210 between the documents can be defined external thereto. This enables relationships to be defined without necessitating modification of one of the documents.

Other relationships beside binary and link are also contemplated and within the scope of the appended claims including but not limited to composition and association. An item has a composition relationship with another item if it is nested within the other. Thus, an item or entity can compose any other item or entity. The following table illustrates a message-participant composition relationship:

TABLE 1

| | | Participants | |
|---|---|---|---|
| Id | Subject | ID | EAddress |
| 1 | Hey! | 1 | Jili |
| | | 2 | Michael |
| 2 | Yay! | 3 | Jili |
| | | 4 | Ben |

As per association, there are several different types including reference, common value, condition, and entity. A reference association can correspond to a primary-key foreign-key relationship. The following example depicts a Customer-Only reference association relationship where TABLE 2 corresponds to the customers and TABLE 3 to the orders:

TABLE 2

| Id | Name |
|---|---|
| 1 | Fred |
| 2 | Wilma |

TABLE 3

| Id | Customer | |
|---|---|---|
| 1 | (1) | ... |
| 2 | (2) | ... |
| 3 | (1) | ... |

A common value association is a relationship where a common value is shared across two or more items. For example, the following tables illustrate a musician common value association is depicted between a person (TABLE 4) and equipment (TABLE 5):

TABLE 4

| Id | Name | Instrument |
|---|---|---|
| 1 | Fred | Piano |
| 2 | John | Guitar |
| 3 | Wilma | Piano |

TABLE 5

| Id | Name |
|---|---|
| 1 | Guitar |
| 2 | Flute |
| 3 | Piano |

A condition association is a relationship expressed by query criteria. The subsequent example provides a contact-document condition association:

TABLE 6

| Id | EmailAddresses |
|---|---|
| 1 | Element 0: benja@xyz.com |
| | Element 1: mbtyalor@xyz.com |
| 2 | Element 0: jili@xyz.com |

TABLE 7

| Id | Author |
|---|---|
| 1 | mbtyalor@xyz.com |
| 2 | jili@xyz.com |
| 3 | benja@xyz.com |

An entity association has n-end points around an item or entity, acting as a hub to other entities via the other types of relations. A link relation can simply be a special case of an entity association that has one hub and two reference-based end-points. The exemplary tables below depict an employment entity association where TABLE 8 corresponds to employment, TABLE 9 corresponds to a person, and TABLE 10 employers:

TABLE 8

| Id | HireDate | EmployeeId | EmployerId |
|----|----------|------------|------------|
| 1  | Jan. 01, 2001 | 2 | 1 |
| 2  | Jan. 01, 2002 | 2 | 2 |
| 3  | Jan. 01, 2003 | 1 | 2 |

TABLE 9

| Id | Name |
|----|------|
| 1  | Fred |
| 2  | Wilma |
| 3  | Barney |

TABLE 10

| Id | Name |
|----|------|
| 1  | Zoo |
| 2  | Boo |

Figure 3:
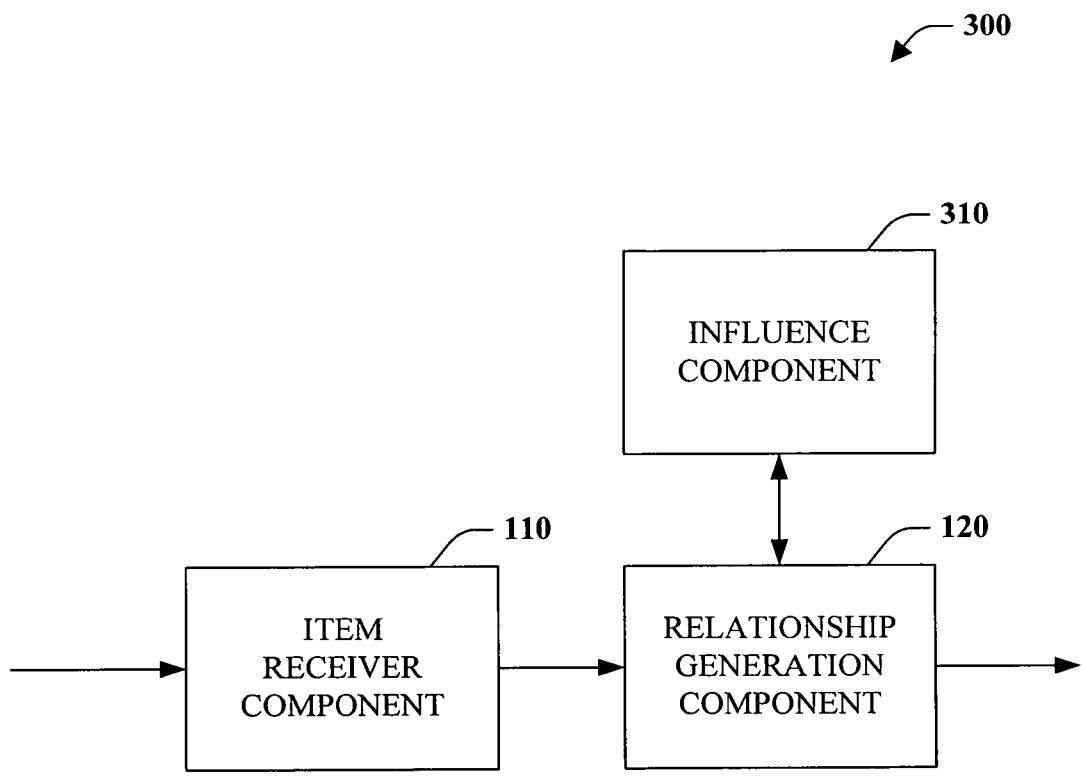
FIG. 3 is a block diagram of a relationship system including an influence component.

FIG. 3 illustrates a relationship system 300 in accordance with an aspect of the subject invention. Similar to system 100 of FIG. 1, system 300 includes an item receiver component 110 and a relationship generation component 120. As described supra, the receiver component 110 can receive and/or retrieve a plurality of elements such as data objects, web pages, or XML documents, to name but a few. The relationship generation component 120 can receive and/or retrieve elements from receiver component 120. The relationship generation component 120 can define or specify relationships or links between the items. Further, the generation component 120 can provide methods or references thereto for retrieving particular items or elements thereof in response to a specified relationship. Again similar to system 100, system 300 can define relationships in a class and the class can include methods for calculating relationships. However, system 300 can also include an influence component 210. The influence component 310 is a mechanism for influencing the naming of relationships. In accordance with an aspect of the subject innovation, the influence component 310 can include, or be communicatively coupled to, a heuristic or artificial intelligence component, method, or mechanism to infer or deduce relationship names based on the names of the related elements. For example, two items "Customer" and "Order" can have a relationship method named "GetCustomerGivenOrder," as in the example supra. Additionally or alternatively, the influence component 310 can aid the relationship generation component 120 by receiving and/or providing a naming scheme driven by external metadata information, for example.

As previously discussed, a relationship can be a binary relationship or a general n-ary relationship (e.g., hub-spoke relationship), among others. A binary relationship can be a one-to-one, one-to-many, many-to-one, or many-to-many relationship as utilized in entity-relationship discourse. The relationship between types S and T can be modeled with a static class. Consider the following example of a class capturing binary several relationships:

```
public static class RelationshipName_Relationship {
    public static IEnumerable<T> GetTsGivenS (S,s);
    public static S GetSGivenT (T t);
    public static IEnumerable<S> GetSsGivenTs
        (IEnumerable<T> ts);
    public static IEnumerable<T> GetTsGivenSs
        (IEnumerable<S> ss);
}
```

In the case of a one-to-one relationship, the GetTsGivenS method returns a single instance of T, and in the case of a many-to-many relationship, the GetSGivenT method returns a collection type such as IEnumerable.

The names of the relationship class, static methods, and argument names can be derived various ways including but not limited to utilizing heuristics based on the type names and employing a naming scheme driven by external metadata information. As also provided previously, the following models the relationship between "Customer" and "Order:"

```
public class Customer {...}
public class Order {...}
public static class OrderRelationship {
    public static Customer GetCustomerGivenOrder(Order order);
    public static IEnumerable<Order> GetOrdersGivenCustomer
        (Customer, customer);
    public static IEnumerable<Customer> GetCustomerGivenOrders
        (IEnumerable<Order> orders);
    public static IEnumerable<Order> GetOrdersGivenCustomers
        (IEnumerable<Customer> customers);
}
```

Given a variable that represents a set of customers in a customer table such as:

IEnumerable<Customer>customers=... ;

The following static method can be utilized to retrieve the set of orders related to that set of customers as follows:

IEnumerable<Order>orders=OrerRelationship.GetOrderGiven Customer(customers);

The static method call encapsulates the join condition:

SELECT (fields) FROM Customer JOIN Order ON (condition)

An n-ary relationship (also referred to herein as entity association) is a set of binary relationships of a particular type, for example, or with other types. One example is the hub and spoke relationship. The design pattern for such a relationship is as follows:

```
public static class RelationshipName_Relationship {
    public static S1 GetSpoke1GivenHub (hub);
    public static IEnumerable<Hub> GetHubsGivenSpoke1 (spoke1);
    public static S2 GetSpoke2GivenHub (hub);
    public static IEnumerable<Hub> GetHubsGivenSpoke2 (spoke2);
    public static IEnumerable<S1> GetSpoke1GivenHub
        (IEnumerable<Hub> hubs);
    public static IEnumerable<Hub> GetHubsGivenSpoke1
        (IEnumerable<S1> spoke1s);
    public static IEnumerable<S2> GetSpoke2GivenHub
        (IEnumerable<Hub> hubs);
    public static IEnumerable<Hub> GetHubsGivenSpoke2
        (IEnumerable<S2> spoke2s);
}
```

Technically, the cardinalities on the various sides of the relationship could be distinguished, but for simplicity assume that all individual binary relationships between the hub and spokes are one-to-many.

As with the simple binary relationship case, the names of the relationship class and the static methods can be derived various ways, ranging from heuristics based on the type names to a naming scheme driven by external metadata information. The following example models the relationship between "Employment," "Person," and "Organization." There are two one-to-many binary relationships, between "Employment" and "Person," and "Employment" and "Organization." "Employment" acts as the hub.

```
public class Person {..}
public class Organization {..}
public class Employment {..}
public static class EmploymentRelationship {
    public static IEnumerable<Employment>
    GetEmploymentsGivenEmployee (Person
employee);
    public static Person GetEmployeeGivenEmployment (Employment
    employment);
    public static IEnumerable<Employment>
    GetEmploymentsGivenEmployer
(Organization employer);
    public static Organization GetEmployerGivenEmployment
(Employment employment);
    public static IEnumerable<Employment>
    GetEmploymentGivenEmployee
        (IEnumerable<Person> employees);
    public static IEnumerable<Person> GetEmployeeGivenEmployment
        (IEnumerable<Employment> employments);
    public static IEnumerable<Employment>
    GetEmploymentGivenEmployer
        (IEnumerable<Organization> employers);
    public static IEnumerable<Organization>
    GetEmployerGivenEmployment
        (IEnumerable<Employment> employments);
}
```

Given a variable that represents a set of people in the person table such as:

IEnumerable<Person>people= . . . ;

The following static method is used to get the set of employments related to that set of people:

IEnumerable<Employment>employments=Employment
    Relationship.GetEmploymentGivenEmployee
    (people);

The following static method is used to get the set of organizations related to that set of employments:

IEnumerable<Organization>employers=EmploymentRelationship.
    GetEmployerGivenEmployment(employments);

The latter static method call encapsulates the join condition:

SELECT (fields) FROM Person JOIN Employment
    ON (condition) JOIN Organization ON (condition)

Type or class relationships can be modeled as relationships with type properties. For instance, consider a scenario including a type person and a type organization, where the organization employs a person and a person is employed by an organization. This is represented in an object oriented language such as C# as follows:

```
public class Person {
    public IEnumerable<Employment>Employments {get;}
}
public class Organization {
    public IEnumerable<Employment> Employments {get;}
}
```

However, modeling with separate classes has advantages over modeling relationships with properties. For example, new relationships can be created between existing types without modifying those types. In the scenario above that uses properties, the "Person" and "Organization" types have a dependency on the "Employment" type. Furthermore, modeling relationships with properties only enables navigation from an instance while modeling relationships from a static class allows navigation from a collection of instances.

While the design pattern using static methods to represent relationships as first class concepts gives a programmer great expressive power, it is syntactically verbose. Moreover, these relationships look different and are less discoverable than relationships modeled as properties.

Figure 4:
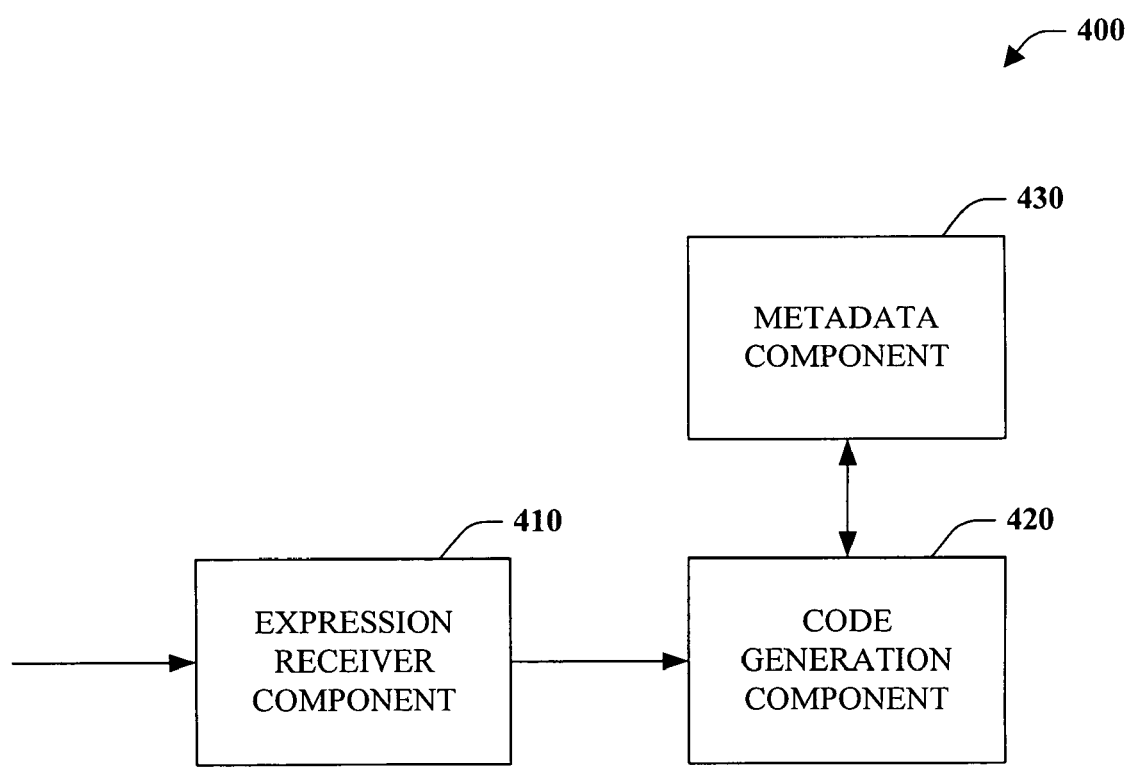
FIG. 4 is a block diagram of a compilation system.

FIG. 4 illustrates a compilation system 400 that unifies syntactically the manner of accessing relationships in accordance with an aspect of the subject innovation. System 400 includes an expression receiver component 410, a code generation component 420, and metadata component 430. Receiver component 410 receives a programmatic expression that includes relationships between items including but not limited to data types. This programmatic expression can be a simplified expression that is specified as if the relationship is a property. For example, given a variable that represents a set of customers in a customer table: "IEnumerable<Customer>customers= . . . ;," the following syntax can be employed to get the set of orders related to that set of customers: "IEnumerable<Order>orders=customer.Orders." The code generation component receives this expression and from the expression generates the more verbose code or call to the a method such as: "OrderRelationship.GetOrderGivenCustomers(customers)." This functionality is enabled by the code generation component 420 via metadata component 430. Metadata component 330 can retrieve or receive metadata regarding a class and provide it to the code generation component 420 to enable a mapping from a simplified expression to the actual or a more verbose expression. This metadata can specify that "OrderRelationship.GetOrderGivenCustomers(customers)" maps to "customer.Order." In accordance with an aspect of the subject innovation, such metadata can be provided in a class defining relationships between elements. Alternatively, the metadata can be provided by some external file or schema that is utilized by the compilation system and/or code generation component 420.

Figure 5:
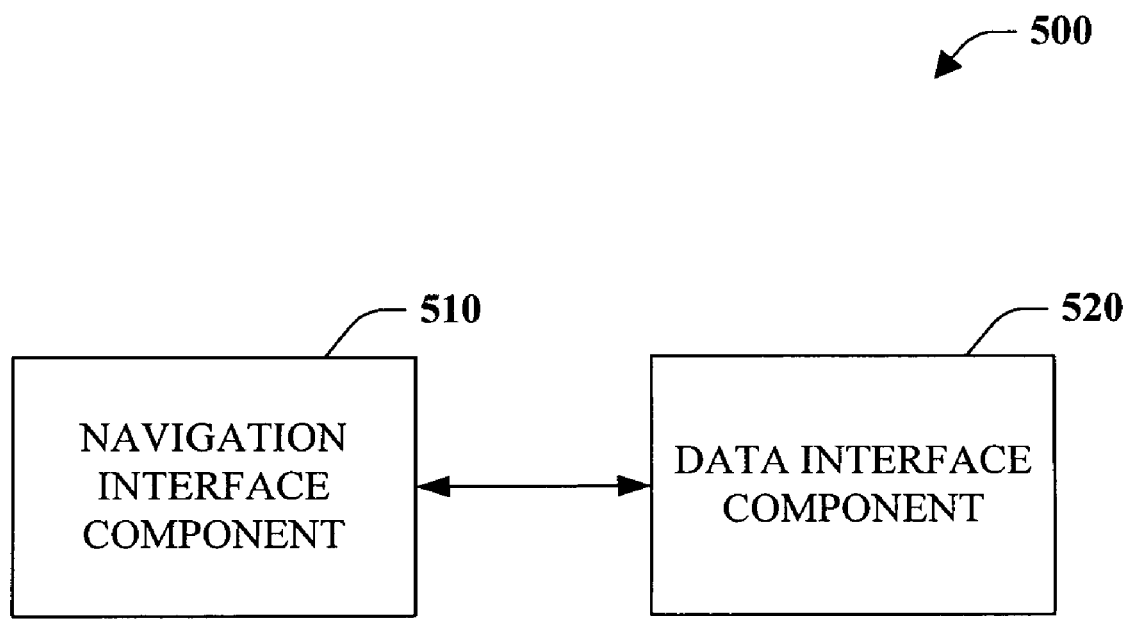
FIG. 5 is a block diagram of an interface system to facilitate interaction with data.

Turning to FIG. 5, an interface system 500 is illustrated to facilitate data interaction. Interface system 500 includes navigation interface component 510 and data interface component 520 communicatively coupled. By way of example, data interface component 520 can implement methods that can be called or executed by the navigation interface component 510 and vice versa. Navigation interface component 510 can received relationship expressions. Interface component 510 can receive either an abbreviated or full length expression such as "customer.Orders" or "OrderRelationship.GetOrderGivenCustomers(customers)," respectively. Where the abbreviation is provided the navigation interface component 510 can convert the expression to the full-length expression. The expression can then be transmitted from the navigation interface component 510 to the data interface component 520. The data interface component 520 can provide the expression for execution on one or more items. If data is retrieved, data interface component 520 can transmit the results back to the navigation interface component 510. Accordingly, navigation interface component 510 and data interface component 520 can correspond to application program interfaces (APIs).

Figure 6:
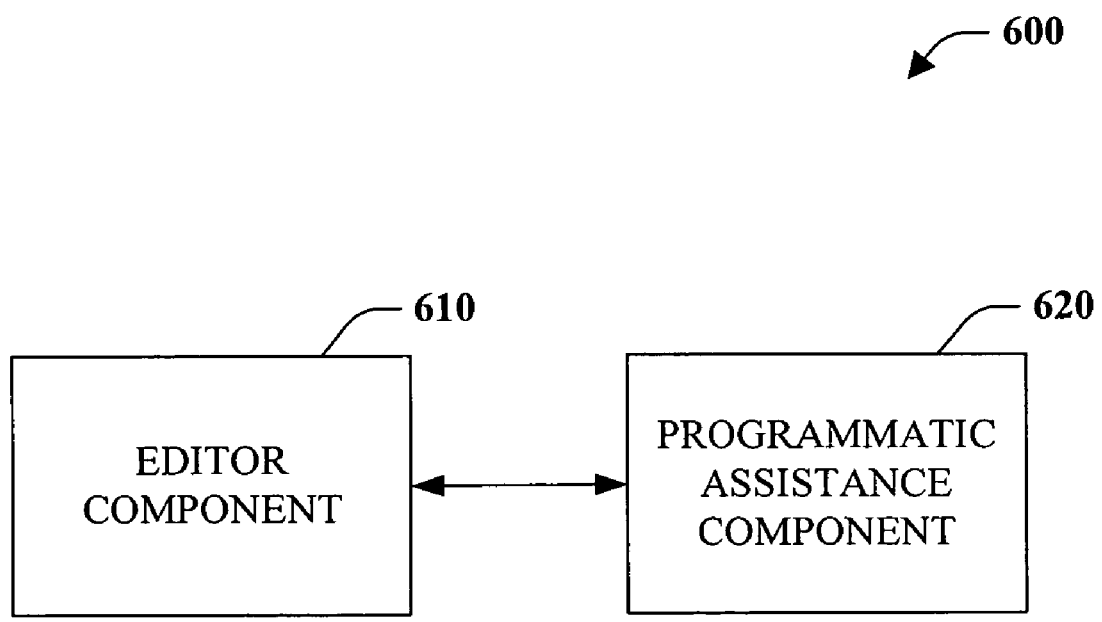
FIG. 6 is a block diagram of an integrated development system or environment.

FIG. 6 depicts an integrated development environment or system 600 in accordance with an aspect of the subject disclosure. System 600 can include an editor component 610 and a programmatic assistance component 620. Editor component 610 is a text editor specialized for editing and/or development of computer source code. In particular, editor component 610 can receive specification of relationships. Text editor is communicatively coupled to programmatic assistance component 620. Assistance component 620 can provide coding assistance including hinting, formatting, colorization, tool tips, and error indication or warning, among other things. For example, in response to receiving an item and a trigger such as a dot the programmatic assistance component 620 can provide and/or cause text editor component 610 to display suggestions for statement completion. Suggestions can be made with respect to relationships as provided herein. For example, upon receiving "customer." "Orders" can be suggested for the complete statement "customer.Orders" denoting that all orders for "customer" be retrieved. Accordingly, hints or suggestions can be made that appear as properties of an item, but that correspond to separate relationship methodologies.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, influence component 310 can employ such methods or mechanisms to infer and influence the relationships names generated.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
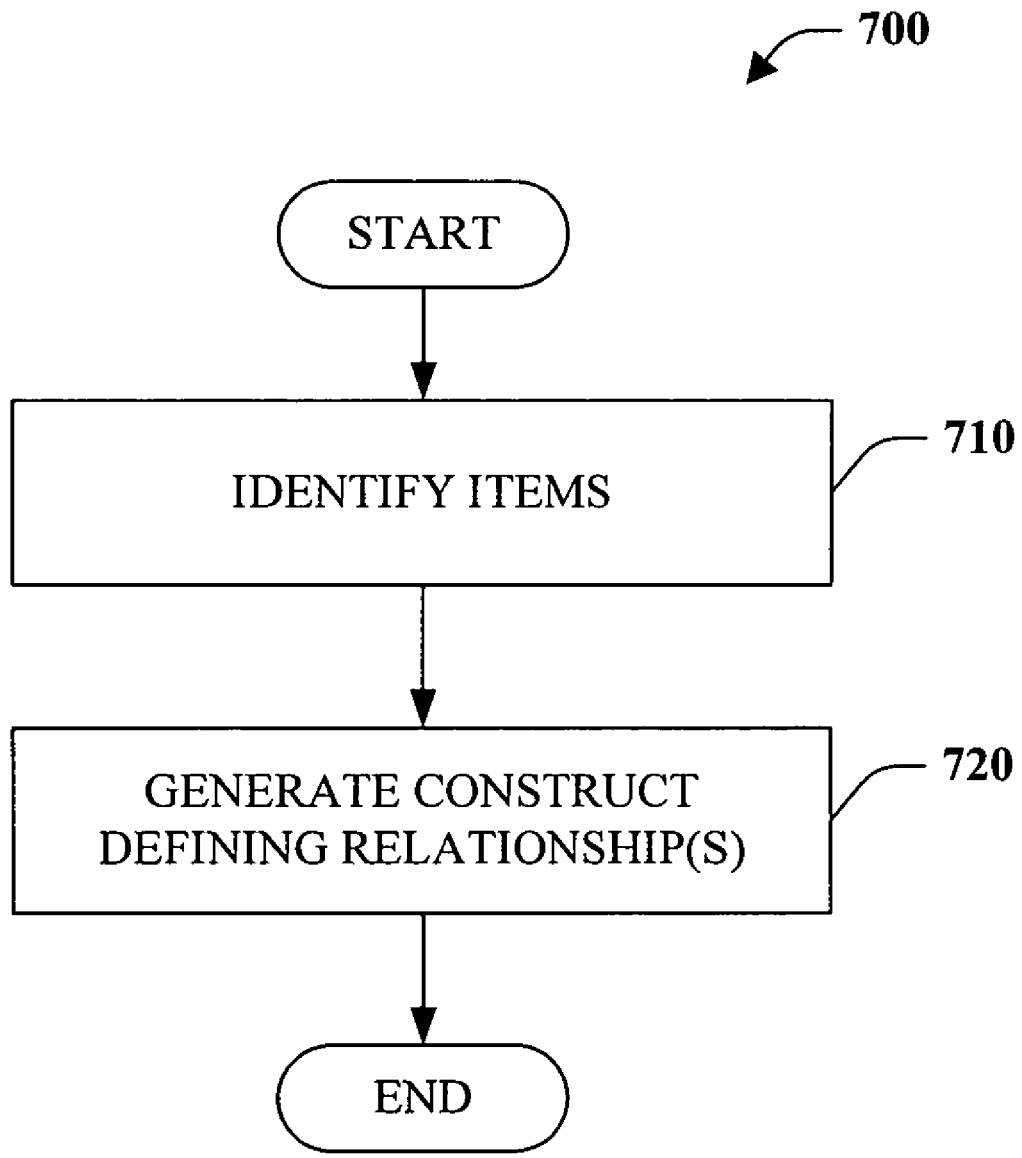
FIG. 7 is a flow chart diagram of method of defining relationships.

Turning to FIG. 7, a method 700 of defining relationships is depicted. At 710, items are received. These can include but are not limited to programmatic items such as data types and documents (e.g., XML, word processing, HTTP . . . ). At 720, a construct such as a class is generated that defines relationships between a plurality of items. For example, the class can be an object oriented static class. Furthermore, the class can include static methods that encapsulate computing and/or navigating item or element relationships. Among other things, the relationships can be binary or n-ary. Additionally, the names of the relationships or methods can be influenced by the names or other metadata associated with the items to be related. It should be appreciated that while classes can be generated automatically, the method 400 can also be practiced manually, for instance by identifying a myriad of elements such as data types and manually specifying a class defining relationships amongst elements in an object oriented programming language with or without the help of an IDE (Integrated Development Environment) or like system.

Figure 8:
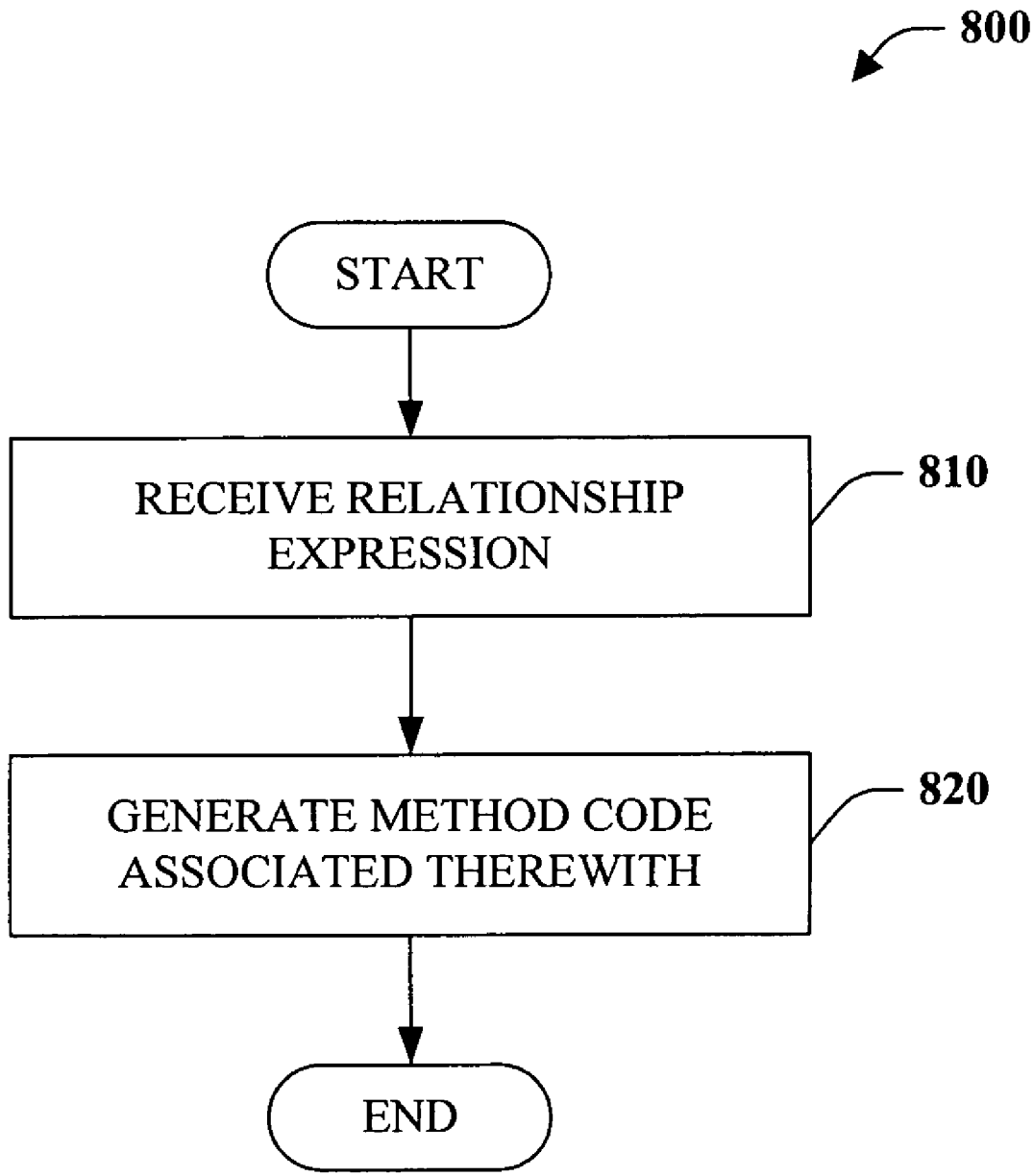
FIG. 8 is a flow chart diagram of compilation methodology.

FIG. 8 depicts a compilation methodology 800 in accordance with an aspect of the disclosure. At 810, a relationship expression is received. The relationship expression can be expressed as a property of a class such as "customer.Orders." At 820, a compiler or other system can receive the expression and generate or expand to code associated with a method defined in a class, for instance, specifying relationships amongst items. To facilitate such code generation, the compiler can utilize metadata, for example, associated with the relationship class to determine the mapping between the expression and the more verbose method invocations. Accordingly, the compiler makes invocation of static methods appear as properties defined directly on the items such as types.

Figure 9:
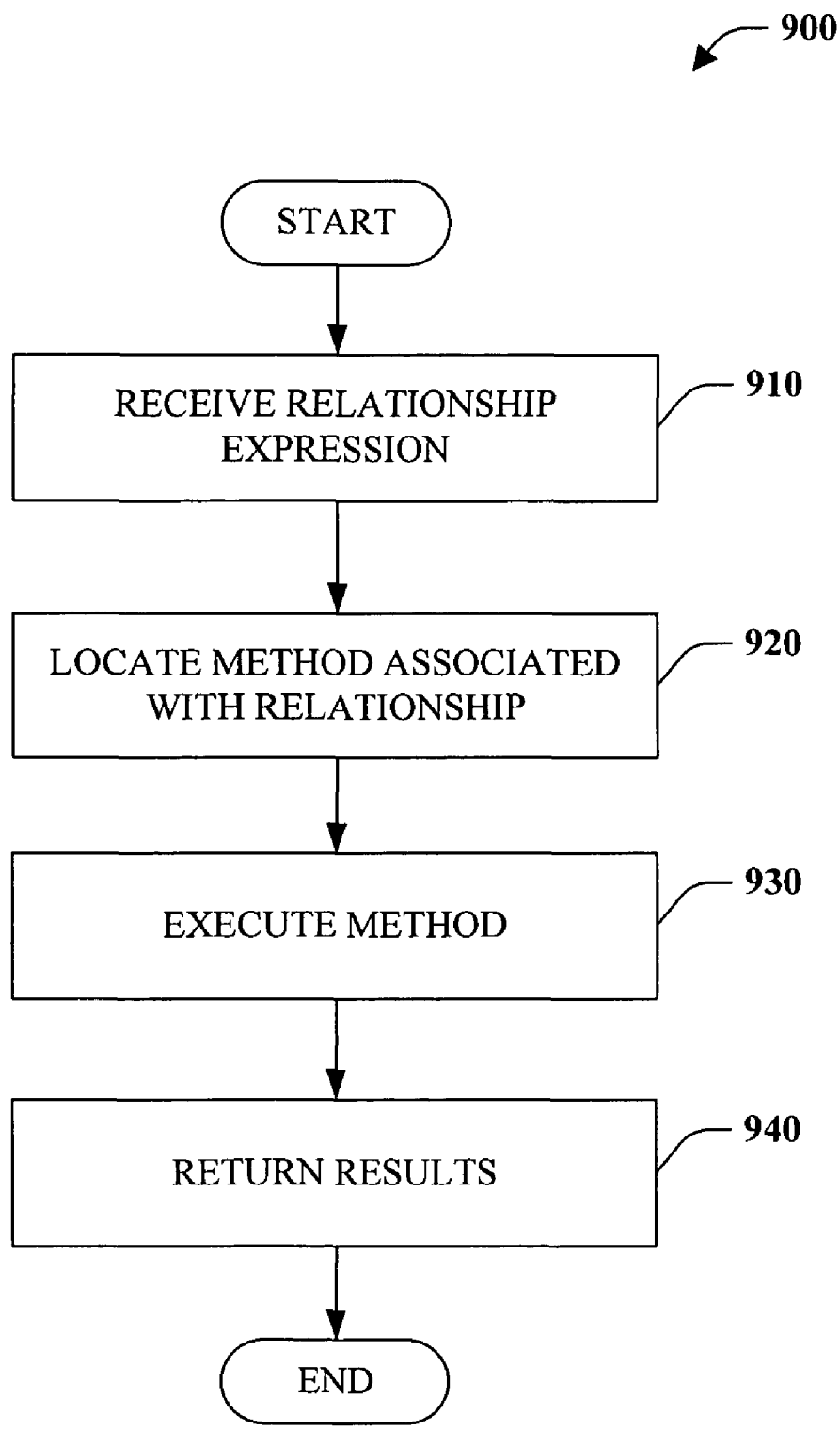
FIG. 9 is a flow chart diagram of a data interaction methodology.

Turning to FIG. 9, a method for interacting with data 900 is illustrated. At reference numeral 910, a relationship expression is received. A relationship expression identifies two or more items or elements and a relationship amongst the items. In accordance with one aspect of the disclosure, the expression can be specified in a property format such that it appears that the relationship is a property of an item, for example, "customer.Orders," "order.Customer," or "orders.Customers." At numeral 920, the method associated with the relationship expression is located. In one instance, the method can reside in a separate relationship class thereby defined independent of items themselves. For example, it can be determined that "customer.Orders" maps to an order relationship class and specifically a method "GetOrdersGivenCustomer(Customer customer)." At 930, the method can be executed. The method can facilitate data navigation and optionally additional functionality such as retrieval, addition, removal or other data interaction or manipulation. At reference numeral 940, results can be returned where appropriated.

Figure 10:
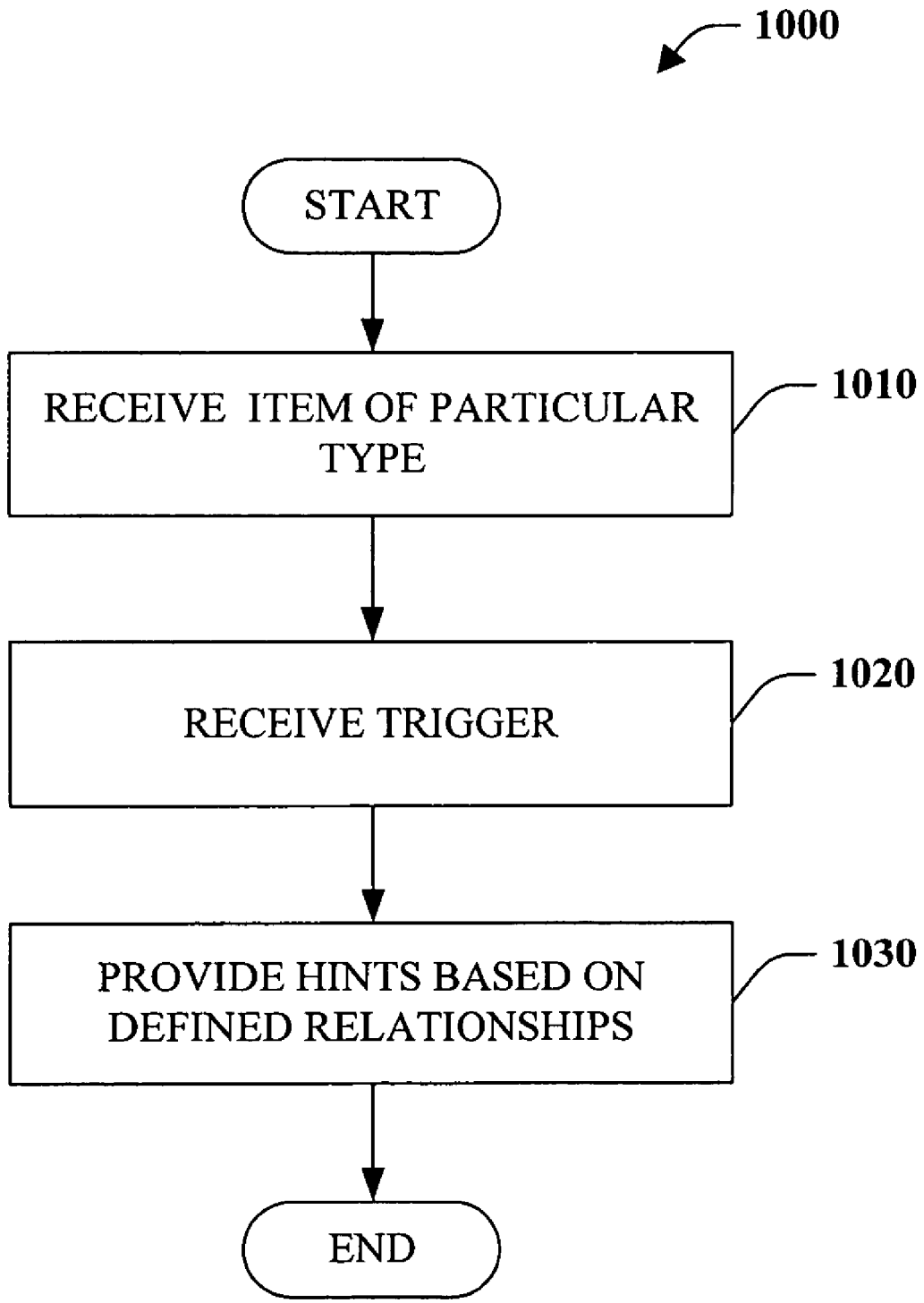
FIG. 10 is a flow chart diagram of a method of assisting program development.

FIG. 10 is a programmatic assistance methodology 1000 in accordance with an aspect of the disclosure. Methodology 1000 can assist in specification of relationships. At reference numeral 1010, an item of a particular type is received, retrieved or otherwise acquired. Following the item, a trigger is received, retrieved or otherwise obtained at 1020. A trigger can correspond to such things as a space (" "), a dot ("."), and a carriage return, among other things. At reference numeral 1030, assistance is provided, for example, in the form of hints based on the defined relationships. For instance, if a user enters "customer." a completion hint can be provided such as "Orders" among other things. The hint can be displayed to a user in a drop down menu, for example. Upon selection, the statement can be completed and read "customer.Orders." This relieves the burden of memorizing or recalling all possible relationships associated with a given item and minimizes typographical errors, inter alia.

In addition to hinting, it should be noted that other forms of programmatic assistance can be provided such as unique formatting and/or colorizing related to relationship expression. Furthermore, tool tips can be provided in which type information, for instance, is bubbled up in a text box or bubble upon rollover or hover of a cursor and/or upon depression of a predetermined combination of keys. Further programmatic assistance regarding relationship expression is also contemplated and within the scope of the subject claims.

Figure 11:
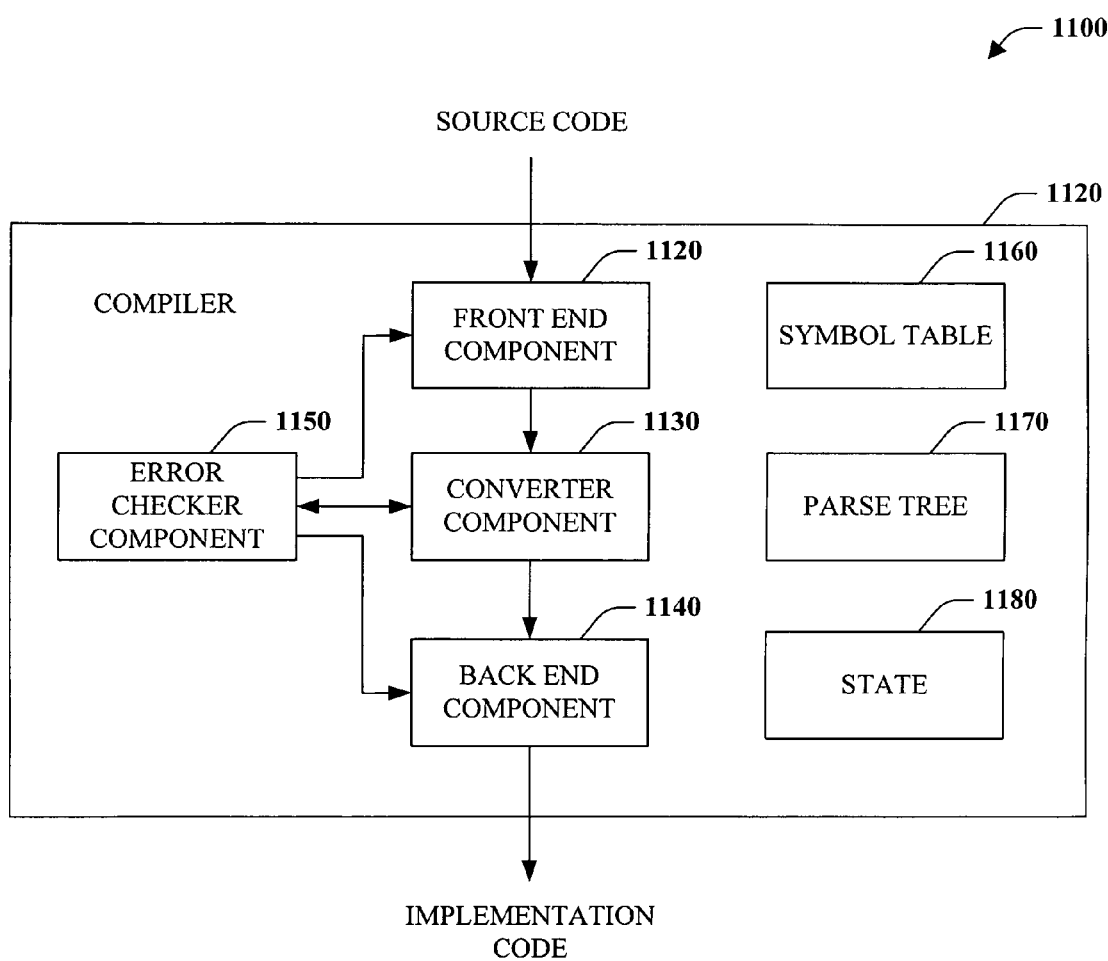
FIG. 11 is a schematic block diagram of an exemplary compilation environment.

FIG. 11 is a block diagram depicting a compiler environment 1100 that can be utilized to generate implementation code (e.g., executable, intermediate language . . . ). However, aspects of the environment 1100 could also be employed as part of a background compiler, for instance related to a code editor, to enable intelligent or context sensitive programming assistance to be provided. The compiler environment 1100 includes a compiler 1120 including front-end component 1120, converter component 1130, back-end component 1140, error checker component 1150, symbol table 1160, parse tree 1170, and state 1180. The compiler 1120 accepts source code as input and produces implementation code as output. The input can include but is not limited to relationship expressions, classes and/or other constructs as described herein. The relationships amongst the components and modules of the compiler environment 1100 illustrate the main flow of data. Other components and relationships are not illustrated for the sake of clarity and simplicity. Depending on implementation, components can be added, omitted, split into multiple modules, combined with other modules, and/or other configurations of modules.

Compiler 1120 can accept as input a file having source code associated with processing of a sequence of elements. The source code may include relationship expressions, classes, other expressions, methods and/or programmatic constructs. Compiler 1120 may process source code in conjunction with one or more components for analyzing constructs and generating or injecting code.

A front-end component 1120 reads and performs lexical analysis upon the source code. In essence, the front-end component 1120 reads and translates a sequence of characters (e.g., alphanumeric) in the source code into syntactic elements or tokens, indicating constants, identifiers, operator symbols, keywords, and punctuation among other things.

Converter component 1130 parses the tokens into an intermediate representation. For instance, the converter component 1130 can check syntax and group tokens into expressions or other syntactic structures, which in turn coalesce into statement trees. Conceptually, these trees form a parse tree 1170. Furthermore and as appropriate, the converter module 1130 can place entries into a symbol table 1130 that lists symbol names and type information used in the source code along with related characteristics.

A state 1180 can be employed to track the progress of the compiler 1120 in processing the received or retrieved source code and forming the parse tree 1170. For example, different state values indicate that the compiler 1120 is at the start of a class definition or functions, has just declared a class member, or has completed an expression. As the compiler progresses, it continually updates the state 1180. The compiler 1120 may partially or fully expose the state 1180 to an outside entity, which can then provide input to the compiler 1120.

Based upon constructs or other signals in the source code (or if the opportunity is otherwise recognized), the converter component 1130 or another component can inject code to facilitate efficient and proper execution. For example, code can be injected to expand a comprehension abbreviation or translate from a query comprehension to sequence operators. Rules coded into the converter component 1130 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1160 and the parse tree 1170, a back-end component 1140 can translate the intermediate representation into output code. The back-end component 1140 converts the intermediate representation into instructions executable in or by a target processor, into memory allocations for variables, and so forth. The output code can be executable by a real processor, but the invention also contemplates output code that is executable by a virtual processor.

Furthermore, the front-end component 1120 and the back end component 1140 can perform additional functions, such as code optimization, and can perform the described operations as a single phase or in multiple phases. Various other aspects of the components of compiler 1120 are conventional in nature and can be substituted with components performing equivalent functions. Additionally, at various stages during processing of the source code, an error checker component 1150 can check for errors such as errors in lexical structure, syntax errors, and even semantic errors. Upon detection error, checker component 1150 can halt compilation and generate a message indicative of the error.

Figure 12:
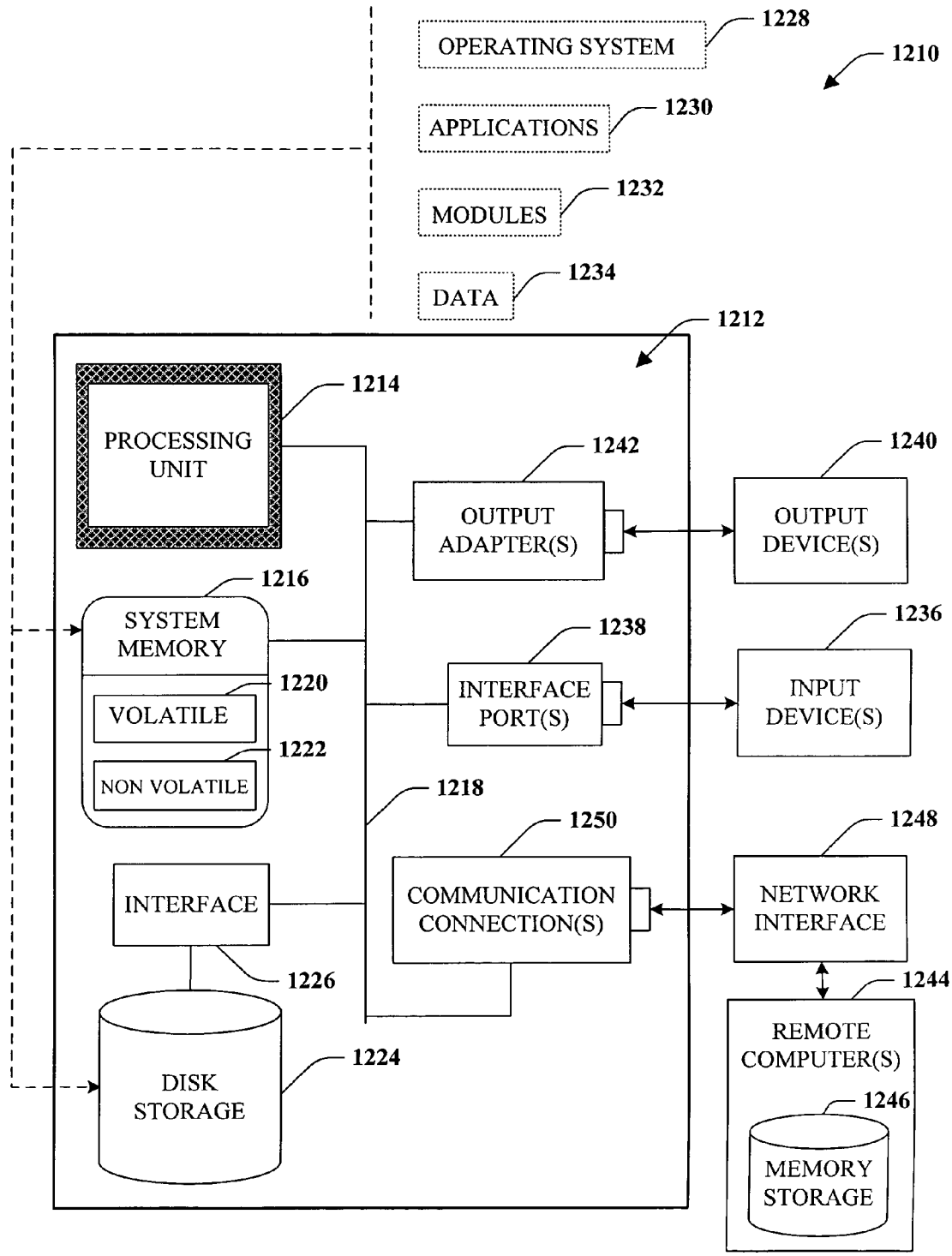
FIG. 12 is a schematic block diagram illustrating a suitable operating environment.
Figure 13:
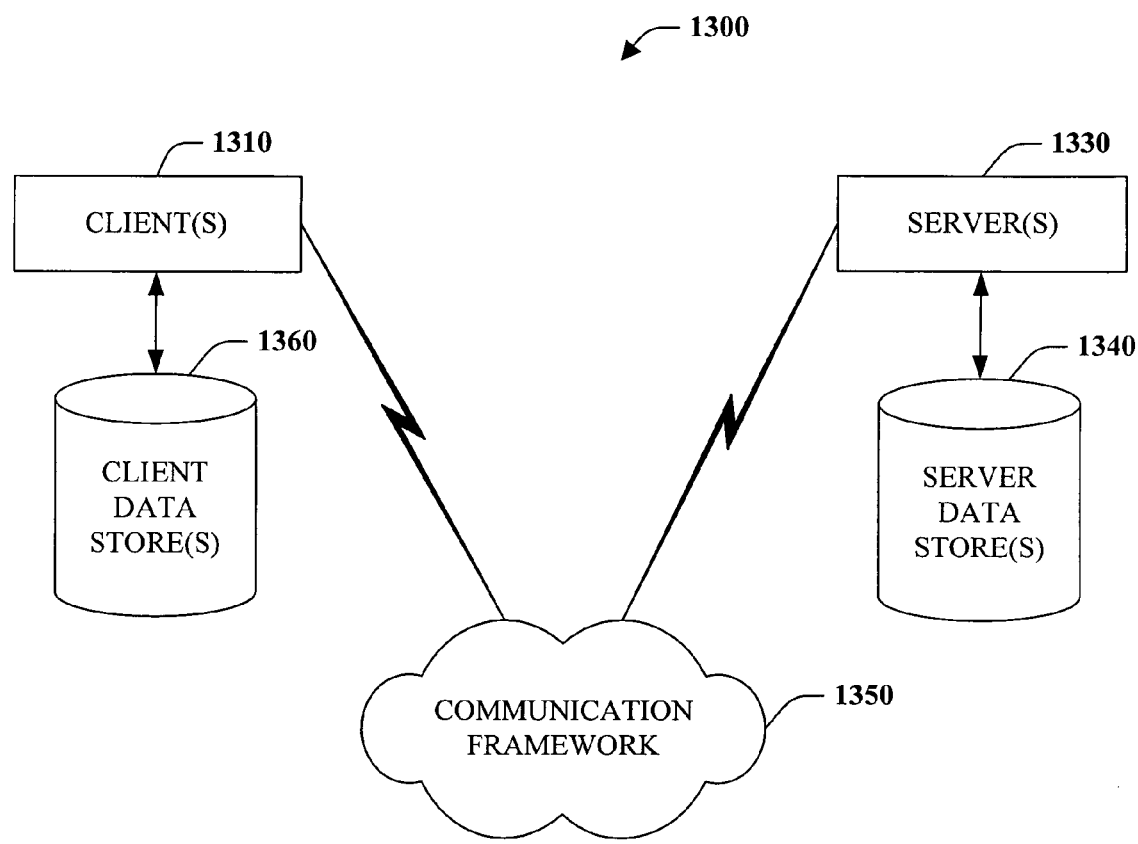
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all, aspects of the subject innovation can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like displays (e.g., flat panel and CRT), speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems, power modems and DSL modems, ISDN adapters, and Ethernet cards or components.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations thereof are used in either the detailed description or the claims, such terms are intended to be inclusive in a manner similar to the term "comprising" as "comprising" is interpreted when employed as a transitional word in a claim.

What is claimed is:

1. A computer-implemented relationship system comprising the following computer-executable components:
   a processor;
   system memory;
   an item receiver component that obtains two or more programmatic items, wherein the programmatic items are of two different formats, wherein at least one of the programmatic items is of a newer format that includes data not permitted by the data items of a different, older format;
   a relationship generation component that receives items from the receiver component and generates a construct external to the items that defines one or more relationships between the items, wherein the relationships are represented by a static class that provides one or more static methods that allow for navigation between items using the relationship represented by the static class and wherein the relationship generation component generates the relationships between the items without modifying the items, the relationships comprising at least two of the following associations: a reference association which comprises a primary-key or foreign-key relationship, a common value association in which a common value is shared across two or more of the items, a condition association in which the relationship is expressed by query criteria and an entity association which comprises n-end points around at least one of the items such that the item acts as a hub to one or more other items via one or more other associations, wherein the relationship generated between the newer format item and the older format item allows data previously not permitted to be stored with the older format data item to be stored by the older format data item;
   a navigation component that navigates the items using the relationship represented by the static class from a collection of class instances, wherein the relationships are accessed using a simplified expression and a mapping stored in metadata, wherein the mapping links to a corresponding verbose expression; and
   an influence component to generate item specific names for relationships, the influence component includes an artificial intelligence component to infer relationship names based on names of related elements, and aids the relationship generation component by receiving and providing a naming scheme driven by external metadata information.

2. The system of claim 1, the items are one of data types and Extensible Markup Language (XML) documents.

3. The system of claim 1, construct is a class.

4. The system of claim 3, the class includes methods to retrieve particular item elements in accordance with a specified relationship.

5. The system of claim 4, the class is a static class.

6. The system of claim 1, the one or more relationships are binary including one-to-one, one-to-many, many-to-one, and many-to-many.

7. The system of claim 1, the one or more relationships are specified by methods that encapsulate navigational computation with respect to the items.

8. The system of claim 1, the one or more relationships include one of a composition, an association and a link.

9. A computer-readable storage medium having stored thereon a data structure comprising:
   a first data type;
   a second data type, wherein the data types are of two different formats, wherein at least one of the data types is of a newer format that includes data not permitted by the data types of a different, older format;
   a class that defines relationships between the first data type and the second data type independent of the types using an external construct external to the first and second data types, wherein the relationships are represented by a static class that provides one or more static methods that allow for navigation between data types using the relationship represented by the static class and wherein the relationships are defined without modifying the first and second data types, the relationships comprising at least two of the following associations: a reference association which comprises a primary-key or foreign-key relationship, a common value association in which a common value is shared across the first and second data types, a condition association in which the relationship is expressed by query criteria and an entity association which comprises n-end points around at least one of the data types such that the data type acts as a hub to one or more other data types via one or more other associations, wherein the relationship generated between the newer format data type and the older format data type allows data previously not permitted to be stored with the older format data type to be stored by the older format data type;
   a navigation component that navigates the data types using the relationship represented by the static class from a collection of class instances, wherein the relationships are accessed using a simplified expression and a mapping stored in metadata, wherein the mapping links to a corresponding verbose expression; and
   an influence component that generates item specific names for relationships, the influence component includes an artificial intelligence component to infer relationship names based on names of related elements.

10. The computer readable medium of claim 9, the class includes methods that encapsulate computations that define the relationships between types.

11. The computer readable medium of claim 10, the relationships include one of binary, composition, association and link.

12. The computer readable medium of claim 10, the types map to database tables and the relationships capture a join on a common property between the tables.

13. At a computer system including a processor and system memory, a computer-implemented method that facilitates data interaction comprising the following computer executable acts:
    receiving a relationship expression between two or more programmatic items, wherein the programmatic items are of two different formats, wherein at least one of the programmatic items is of a newer format that includes data not permitted by the data items of a different, older format, the relationship being represented in a corresponding programming language with a static class, wherein the static class provides one or more static methods that allow for navigation between items using the relationship represented by the static class;
    locating a method external to the items associated with the expression;
    executing the method using the processor to compute the relationship between the items using an external construct external to the items such that the relationship between the items is defined without modifying the items, the relationship comprising at least two of the following associations: a reference association which comprises a primary-key or foreign-key relationship, a common value association in which a common value is shared across two or more of the items, a condition association in which the relationship is expressed by query criteria and an entity association which comprises n-end points around at least one of the items such that the item acts as a hub to one or more other items via one or more other associations, wherein the relationship generated between the newer format item and the older format item allows data previously not permitted to be stored with the older format data item to be stored by the older format data item;
    navigating the items using the relationship represented by the static class from a collection of class instances, wherein the relationship is accessed using a simplified expression and a mapping stored in metadata, wherein the mapping links to a corresponding verbose expression;
    generating item specific names for the relationship, wherein an artificial intelligence component infers relationship names based on names of related elements; and
    receiving and providing a naming scheme driven by external metadata information.

14. The method of claim 13, further comprising returning results.

15. The method of claim 13, receiving a relationship expression comprises receiving a relationship between types in property notation.

16. The method of claim 15, locating a method comprises expanding the expression from property notation to a method name.

17. The method of claim 16, locating a method further comprising identifying a relationship class including one or more relationship methods.

18. The method of claim 13, the relationships include one of binary, composition, association and link.

* * * * *